United States Patent
Kwon et al.

(10) Patent No.: US 10,454,308 B2
(45) Date of Patent: Oct. 22, 2019

(54) METHOD FOR DISTRIBUTING WIRELESS CHARGE POWER FOR MULTIPLE WIRELESS POWER RECEIVERS

(71) Applicant: Samsung Electronics Co., Ltd., Gyeonggi-do (KR)

(72) Inventors: Hyuk-Choon Kwon, Seoul (KR); Nam-Yun Kim, Seoul (KR); Soo-Yeon Jung, Seoul (KR); Hee-Won Jung, Gyeonggi-do (KR); Jae-Sung Han, Seoul (KR)

(73) Assignee: Samsung Electronics Co., Ltd. (KR)

( * ) Notice: Subject to any disclaimer, the term of this patent is extended or adjusted under 35 U.S.C. 154(b) by 143 days.

(21) Appl. No.: 15/037,916

(22) PCT Filed: Nov. 19, 2014

(86) PCT No.: PCT/KR2014/011137
§ 371 (c)(1),
(2) Date: May 19, 2016

(87) PCT Pub. No.: WO2015/076561
PCT Pub. Date: May 28, 2015

(65) Prior Publication Data
US 2016/0294220 A1 Oct. 6, 2016

(30) Foreign Application Priority Data
Nov. 19, 2013 (KR) .................. 10-2013-0141007

(51) Int. Cl.
*H01F 27/42* (2006.01)
*H01F 37/00* (2006.01)
(Continued)

(52) U.S. Cl.
CPC ............. *H02J 50/12* (2016.02); *H02J 50/40* (2016.02); *H02J 50/60* (2016.02); *H02J 50/80* (2016.02)

(58) Field of Classification Search
CPC .. H02J 7/025; H02J 50/40; H02J 50/60; H02J 50/12; H02J 50/80
See application file for complete search history.

(56) References Cited

U.S. PATENT DOCUMENTS 9,047,074 B2 * 6/2015 Pfeifer ............... G06F 1/266
9,532,393 B2 * 12/2016 Yamazaki ............ H04W 48/02
(Continued)

FOREIGN PATENT DOCUMENTS

| CN | 102334258 | 1/2012 |
| CN | 102341985 | 2/2012 |

(Continued)

OTHER PUBLICATIONS

Chinese Office Action dated Sep. 29, 2017 issued in counterpart application No. 201480063068.2, 30 pages.
(Continued)

*Primary Examiner* — Alfonso Perez Borroto
*Assistant Examiner* — Esayas G Yeshaw
(74) *Attorney, Agent, or Firm* — The Farrell Law Firm, P.C.

(57) ABSTRACT

One embodiment of the present invention is capable of providing a method for efficiently transmitting power for multiple wireless power receivers by distributing the power of the wireless power receivers as power which matches the respective wireless power receivers in accordance with demand power information from the multiple wireless power receivers.

15 Claims, 11 Drawing Sheets

(51) Int. Cl.
*H01F 38/00* (2006.01)
*H02J 50/12* (2016.01)
*H02J 50/60* (2016.01)
*H02J 50/80* (2016.01)
*H02J 50/40* (2016.01)

(56) References Cited

U.S. PATENT DOCUMENTS

| | | | | |
|---|---|---|---|---|
| 2008/0071487 | A1* | 3/2008 | Zeng | G01N 29/028 702/65 |
| 2009/0230777 | A1* | 9/2009 | Baarman | H01F 38/14 307/104 |
| 2010/0171461 | A1 | 7/2010 | Baarman et al. | |
| 2010/0248622 | A1* | 9/2010 | Lyell Kirby | H02J 7/025 455/41.1 |
| 2011/0254379 | A1* | 10/2011 | Madawala | H02J 5/005 307/104 |
| 2011/0298297 | A1 | 12/2011 | van Wageningen et al. | |
| 2012/0032632 | A1* | 2/2012 | Soar | H01F 38/14 320/108 |
| 2013/0119778 | A1 | 5/2013 | Jung | |
| 2013/0181664 | A1 | 7/2013 | Min et al. | |
| 2013/0217332 | A1* | 8/2013 | Altman | H04H 60/90 455/41.2 |
| 2014/0008990 | A1* | 1/2014 | Yoon | H02J 5/005 307/104 |
| 2014/0103733 | A1* | 4/2014 | Irie | H02J 5/005 307/104 |
| 2014/0183970 | A1* | 7/2014 | Kurihara | H02J 50/80 307/104 |
| 2014/0285143 | A1* | 9/2014 | Kwon | H02J 7/007 320/108 |
| 2015/0028688 | A1 | 1/2015 | Masaoka | |
| 2016/0219441 | A1* | 7/2016 | Park | H04W 74/0816 |

FOREIGN PATENT DOCUMENTS

| | | |
|---|---|---|
| KR | 1020120134079 | 12/2012 |
| KR | 1020130051970 | 5/2013 |
| KR | 1020130073862 | 7/2013 |
| KR | 1020130083660 | 7/2013 |
| WO | WO 2013128597 | 9/2013 |

OTHER PUBLICATIONS

PCT/ISA/210 Search Report issued on PCT/KR2014/011137 (pp. 3).

PCT/ISA/237 Written Opinion issued on PCT/KR2014/011137 (pp. 6).

* cited by examiner

METHOD FOR DISTRIBUTING WIRELESS CHARGE POWER FOR MULTIPLE WIRELESS POWER RECEIVERS

PRIORITY

This application is a National Phase Entry of PCT International Application No. PCT/KR2014/011137, which was filed on Nov. 19, 2014, and claims priority to Korean Patent Application No. 10-2013-0141007, which was filed on Nov. 19, 2013, the contents of each of which are incorporated herein by reference.

TECHNICAL FIELD

Embodiments of the present invention relate to wireless charging, and more particularly, to a method for distributing wireless charging power to a plurality of wireless power receivers in a wireless charging network.

BACKGROUND ART

Recently, wireless charging technology or non-contact charging technology has been developed and has been widely utilized in various electronic devices. The wireless charging technology is a system that uses wireless power transmission and reception in which, for example, the battery of a mobile phone may be automatically charged by simply placing the mobile phone on a charging pad without connecting to a separate charging connector. The wireless charging technology can enhance the waterproof function by wirelessly charging the electronic products, and can improve the portability of electronic equipment because a wired charger is not necessary.

Among them, charging by using a resonance method is performed as follows. When a wireless power receiver (e.g., a mobile terminal), which requires charging, is positioned on a wireless power transmitter (e.g., a charging pad), which transmits wireless power, the wireless power transmitter may charge the wireless power receiver. In the case where a plurality of wireless power receivers are placed in a charging area of a single wireless power transmitter, there may be a difference between the power that is necessary for respective wireless power receivers and the transmission power, so respective wireless power receivers are required to be efficiently charged.

DETAILED DESCRIPTION OF THE INVENTION

Technical Problem

As described above, the power required by the wireless power receiver may be different from the power that can be transmitted from the wireless power transmitter. However, wireless power receivers are currently charged without a separate setting according to the power supply capability of the wireless power transmitter. However, the charging efficiency may vary depending on various charging conditions, such as the features of the wireless power receiver, hardware design, the distance between the wireless power receiver and the wireless power transmitter, or the charging position. Furthermore, in the case of transmitting power to a plurality of wireless power receivers, it is necessary to adjust and transmit the power for more efficient power transmission.

Technical Solution

Therefore, the embodiment of the present invention provides a method for efficiently distributing the wireless charging power to a plurality of wireless power receivers.

A method of distributing wireless charging power to a plurality of wireless power receivers in a wireless power transmitter, according to the embodiment of the present invention, may include: transmitting power to the first wireless power receiver to then charge the same; receiving demand power information of the second wireless power receiver; determining power redistribution for the first wireless power receiver and the second wireless receiver based on the demand power information; and transmitting the power according to the power redistribution to the first wireless power receiver and the second wireless receiver, respectively.

A wireless power transmitter for distributing wireless charging power to a plurality of wireless power receivers, according to the embodiment of the present invention, may include: a charging unit that transmits power to the first wireless power receiver to then charge the same; a communication unit that receives demand power information of the second wireless power receiver; and a controller that controls the charging unit to determine power redistribution for the first wireless power receiver and the second wireless receiver based on the demand power information, and to transmit the power according to the power redistribution to the first wireless power receiver and the second wireless receiver, respectively.

Advantageous Effects

According to the embodiment of the present invention, the amount of power distribution for each wireless power receiver may be determined in consideration of the states of a plurality of wireless power receivers and the wireless power transmitter so that the power can be efficiently transmitted.

MODE FOR CARRYING OUT THE INVENTION

Figure 1:
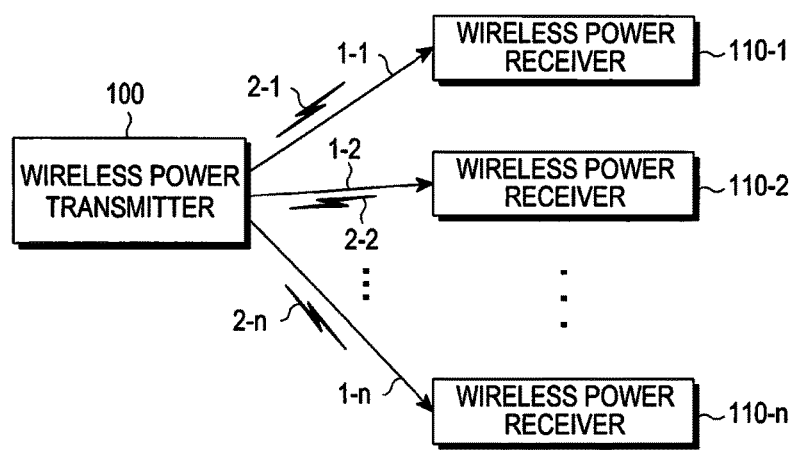
FIG. 1 is a conceptual diagram illustrating the overall operations of a wireless charging system.

Hereinafter, the preferred embodiment of the present invention will be described in more detail with reference to the accompanying drawings. It should be noted that the same components of the drawings are designated by the same reference numeral anywhere. In the following description of the present invention, a detailed description of known functions and configurations incorporated herein will be omitted when it may make the subject matter of the present invention rather unclear.

The embodiment of the present invention may provide a method for efficiently transmitting power to a plurality of wireless power receivers by distributing the power of the wireless power receivers to be suitable for respective wireless power receivers according to demand power information in the plurality of wireless power receivers.

According to the wireless charging standard, in the resonance type of wireless charging, the wireless power transmitter (Power Transmission Unit; PTU) is connected to the wireless power receiver (Power Receive Unit; PRU) by communication, and thereafter, the PRU and the PTU exchange their static parameters through static signals in order to thereby transmit its own state to the other party.

In the embodiments of the present invention, a plurality of PRUs may transmit limitation power information to the PTU, and then the PTU may more effectively distribute the charging power to each PRU. At this time, for example, a PRU dynamic signal may be used to transmit the limitation power information from the PRU to the PTU, but the present invention is not limited thereto, and newly defined other signals or predefined other signals may be used to transmit the same.

First, the concept of a wireless charging system, which can be applied to the embodiment of the present invention, will be described with reference to FIG. 1 to FIG. 11.

FIG. 1 is a conceptual diagram illustrating the overall operations of the wireless charging system. As shown in FIG. 1, the wireless charging system includes a wireless power transmitter 100 and one or more wireless power receivers 110-1, 110-2, and 110-n.

The wireless power transmitter 100 may wirelessly transmit the power 1-1, 1-2, or 1-n to the one or more wireless power receivers 110-1, 110-2, and 110-n. More specifically, the wireless power transmitter 100 may wirelessly transmit the power 1-1, 1-2, or 1-n only to the wireless power receivers that have been verified through a predetermined verification process.

The wireless power transmitter 100 may form electrical connections with the wireless power receivers 110-1, 110-2, and 110-n. For example, the wireless power transmitter may transmit the wireless power in the form of an electromagnetic wave to the wireless power receivers 110-1, 110-2, and 110-n.

Meanwhile, the wireless power transmitter 100 may perform bilateral communication with the wireless power receivers 110-1, 110-2, and 110-n. Here, the wireless power transmitter 100 and the wireless power receivers 110-1, 110-2, and 110-n may process, or transmit/receive, packets 2-1, 2-2, and 2-n, which are comprised of predetermined frames. The aforementioned frames will be described later in more detail. The wireless power receivers may be implemented by, in particular, mobile communication terminals, PDAs, PMPs, or smart phones.

The wireless power transmitter 100 may wirelessly provide power to a plurality of the wireless power receivers 110-1, 110-2, and 110-n. For example, the wireless power transmitter 100 may wirelessly transmit power to a plurality of the wireless power receivers 110-1, 110-2, and 110-n by a resonance method. In the case where the wireless power transmitter 100 adopts the resonance method, the distance between the wireless power transmitter 100 and each of the plurality of wireless power receivers 110-1, 110-2, and 110-n, preferably, may be equal to, or less than, 30 m. In addition, in the case where the wireless power transmitter 100 adopts an electromagnetic induction method, the distance between the power supply device 100 and each of the plurality of wireless power receivers 110-1, 110-2, and 110-n, preferably, may be equal to, or less than, 10 cm.

The wireless power receivers 110-1, 110-2, and 110-n may receive wireless power from the wireless power transmitter 100 in order to thereby charge a battery. In addition, the wireless power receivers 110-1, 110-2, and 110-n may transmit, to the wireless power transmitter 100, a signal that requests the wireless power transmission, information that is necessary for the wireless power reception, state information of the wireless power receiver, or control information of the wireless power transmitter 100. The information on the transmission signal will be described later in more detail.

In addition, the wireless power receivers 110-1, 110-2, and 110-n may transmit, to the wireless power transmitter 100, a message indicating the charging state of each wireless power receiver.

The wireless power transmitter 100 may include display means, such as a display, in order to thereby display the state of each of the wireless power receivers 110-1, 110-2, and 110-n based on the message received from each of the wireless power receivers 110-1, 110-2, and 110-n. Furthermore, the wireless power transmitter 100 may display the estimated time remaining to complete the charging of each of the wireless power receivers 110-1, 110-2, and 110-n.

The wireless power transmitter 100 may transmit a control signal for disabling the wireless charging function to each of the wireless power receivers 110-1, 110-2, and 110-n. The wireless power receivers, which have received the control signal of disabling the wireless charging function from the wireless power transmitter 100, may disable the wireless charging function.

Figure 2:
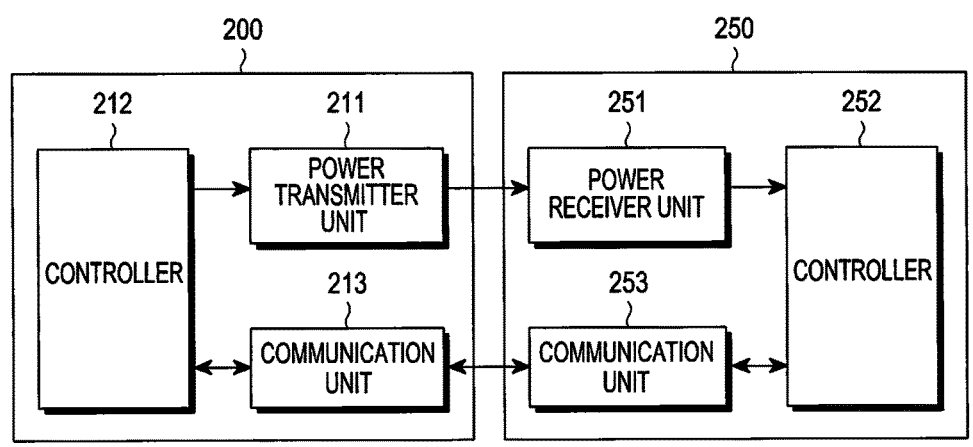
FIG. 2 is a block diagram of a wireless power transmitter and a wireless power receiver, according to the embodiment of the present invention.

FIG. 2 is a block diagram of a wireless power transmitter and a wireless power receiver, according to the embodiment of the present invention.

As shown in FIG. 2, the wireless power transmitter 200 may include a power transmitting unit 211, a controller 212, and a communication unit 213. In addition, the wireless power receiver 250 may include a power receiving unit 251, a controller 252, and a communication unit 253.

The power transmitting unit 211 may provide the power required by the wireless power transmitter 200, and may wirelessly provide the power to the wireless power receiver 250. Here, the power transmitting unit 211 may supply power in the form of an alternating current wave, or may supply power in the form of a direct current wave that is converted into an alternating current wave by an inverter to then be supplied in the form of an alternating current wave. The power transmitting unit 211 may be implemented in the form of a built-in battery, or may be implemented in the form of a power receiving interface in order to thereby receive power from the outside and in order to thereby supply the same to other components. It may be understood by those skilled in the art that the power transmitting unit 211 is not limited and any means, which can provide power in an alternating current waveform, may be adopted as the same.

Furthermore, the power transmitting unit 211 may provide the wireless power receiver 250 with an alternating current wave in the form of an electromagnetic wave. The power transmitting unit 211 may further include a resonant circuit, and thus, it may transmit or receive a predetermined electromagnetic wave. If the power transmitting unit 211 is implemented by the resonant circuit, the inductance (L) of the loop coil of the resonant circuit may be variable. Meanwhile, it may be understood by those skilled in the art that the power transmitting unit 211 is not limited and any means, which can transmit and receive an electromagnetic wave, may be adopted as the same.

The controller 212 may control the overall operations of the wireless power transmitter 200. The controller 212 may control the overall operations of the wireless power transmitter 200 by using algorithms, programs, or applications, which are read from a storage unit (not shown) for control. The controller 212 may be implemented in the form of a CPU, a microprocessor, or a minicomputer. The detailed operation of controller 212 will be described later in more detail.

The communication unit 213 may perform communication with the wireless power receiver 250 in a predetermined manner. The communication unit 213 may perform communication with the communication unit 253 of the wireless power receiver 250 by using a scheme of NFC (near field communication), Zigbee communication, infrared communication, visible light communication, Bluetooth communication, or BLE (Bluetooth low energy). The communication unit 213 may use a CSMA/CA algorithm as well. Meanwhile, the aforementioned communication schemes are merely exemplary, and the scope of the embodiments of the present invention is not limited to a specific communication scheme performed by the communication unit 213.

Meanwhile, the communication unit 213 may transmit a signal for information on the wireless power transmitter 200. Here, the communication unit 213 may unicast, multicast, or broadcast signals.

In addition, the communication unit 213 may receive power information from the wireless power receiver 250. Here, the power information may contain at least one of: the capability of the wireless power receiver 250; the battery percentage, the number of times that charging occurs, the amount of usage, the battery capacity, or the battery ratio.

In addition, the communication unit 213 may transmit a charging function control signal for controlling the charging function of the wireless power receiver 250. The charging function control signal may control the wireless power receiving unit 251 of a specific wireless power receiver 250 to enable, or disable, the charging function. Alternatively, as will be described later in more detail, the power information may contain information, such as the leading-in of a wired charging terminal, the switch from an SA mode into an NSA mode, and the release of an error situation.

The communication unit 213 may receive signals from another wireless power transmitter (not shown) as well as from the wireless power receiver 250. For example, the communication unit 213 may receive a notice signal from another wireless power transmitter.

Meanwhile, although the power transmitting unit 211 and the communication unit 213 are illustrated to be different hardware elements such that the wireless power transmitter 200 performs the out-band type of communication in FIG. 2, this is only an example. In the present invention, the power transmitting unit 211 and the communication unit 213 may be implemented as a single hardware element so that the wireless power transmitter 200 may perform the in-band type of communication.

The wireless power transmitter 200 and the wireless power receiver 250 may transmit and receive various signals, and thus, the registration of the wireless power receiver 250 in a wireless power network, which is managed by the wireless power transmitter 200, and the charging operation through the transmission and reception of wireless power may be performed. The operation above will be described later in more detail.

Figure 3:
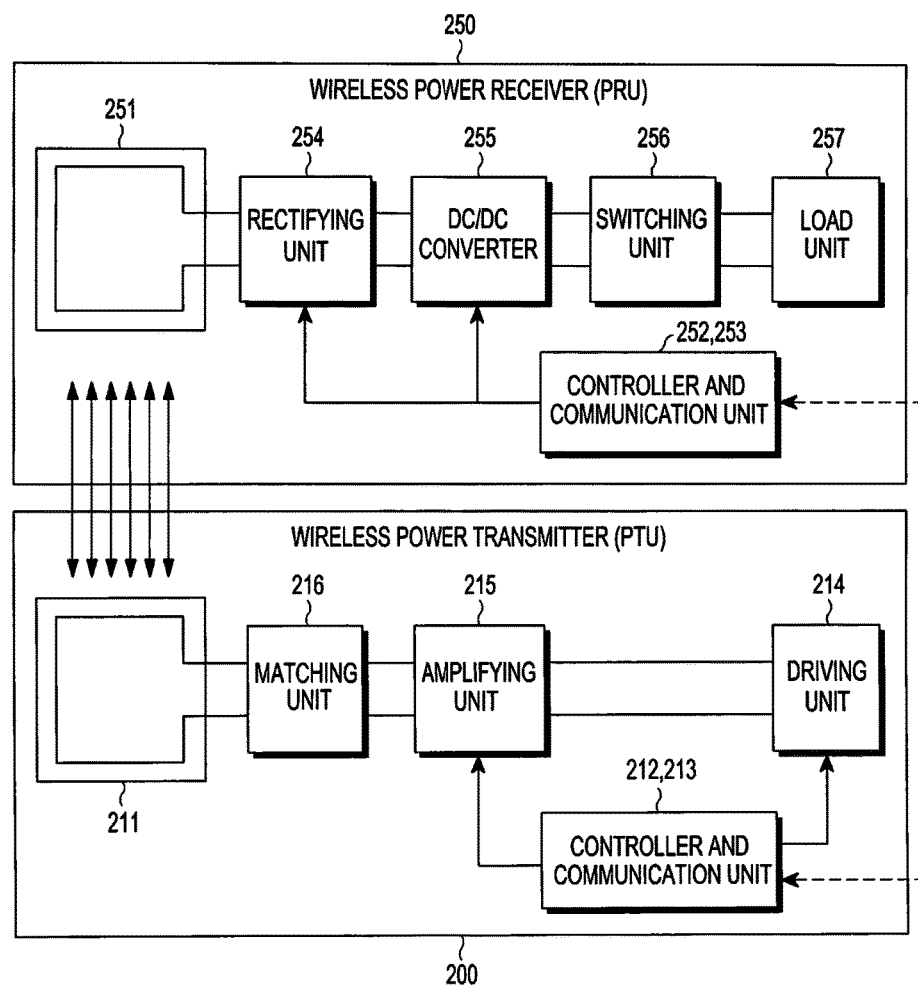
FIG. 3 is a detailed block diagram of a wireless power transmitter and a wireless power receiver, according to an embodiment of the present invention.

FIG. 3 is a detailed block diagram of the wireless power transmitter and the wireless power receiver, according to an embodiment of the present invention.

As shown in FIG. 3, the wireless power transmitter 200 may include a power transmitting unit 211, a controller and communication unit 212 and 213, a driving unit 214, an amplifying unit 215, and a matching unit 216. The wireless power receiver 250 may include a power receiving unit 251, a controller and communication unit 252 and 253, a rectifying unit 254, a DC/DC converter 255, a switching unit 256, and a load unit 257.

The driving unit 214 may output a direct current power of a predetermined voltage value. The voltage value of the direct current power, which is output from the driving unit 214, may be controlled by the controller and communication unit 212 and 213.

The direct current outputted from the driving unit 214 may be outputted to the amplifying unit 215. The amplifying unit 215 may amplify the direct current with a predetermined gain. In addition, the amplifying unit may convert the direct current power into an alternating current on the basis of a signal, which is inputted from the controller and communication unit 212 and 213. According to this, the amplifying unit 215 may output an alternating current power.

The matching unit 216 may perform impedance matching. For example, by adjusting the impedance viewed from the matching unit 216, high-efficient power or high power may be outputted. The matching unit 216 may adjust the impedance based on the control of the controller and communication unit 212 and 213. The matching unit 216 may include at least one of a coil or a capacitor. The controller and communication unit 212 and 213 may control the connection state with at least one of the coil or the capacitor in order to thereby perform impedance matching.

The power transmitting unit 211 may transmit the inputted alternating current power to the power receiving unit 251. The power transmitting unit 211 and the power receiving unit 251 may be implemented to be resonant circuits having the same resonance frequency. For example, the resonant frequency may be determined to be 6.78 MHz.

Meanwhile, the controller and communication unit 212 and 213 may communicate with the controller and communication unit 252 and 253 of the wireless power receiver 250, and for example, they may perform communication (WiFi, ZigBee, or BT/BLE) in a bilateral frequency of 2.4 GHz.

Meanwhile, the power receiving unit 251 may receive charge power.

The rectifying unit 254 may rectify wireless power received by the power receiving unit 251 into a direct current form, and, for example, may be implemented in the form of a bridge diode. The DC/DC converter 255 may convert the rectified power into the power of a predetermined gain. For example, the DC/DC converter 255 may convert the rectified power such that the voltage of the output terminal is 5V. Meanwhile, the minimum and maximum values of the voltage, which can be applied to the front terminal of the DC/DC converter 255, may be pre-configured.

The switching unit 256 may connect the DC/DC converter 255 and the load unit 257. The switching unit 256 may maintain the on/off state according to the control of the controller 252. The load unit 257 may store the converted power, which is inputted from the DC/DC converter 255, when the switching unit 256 is in the on state.

Figure 4:
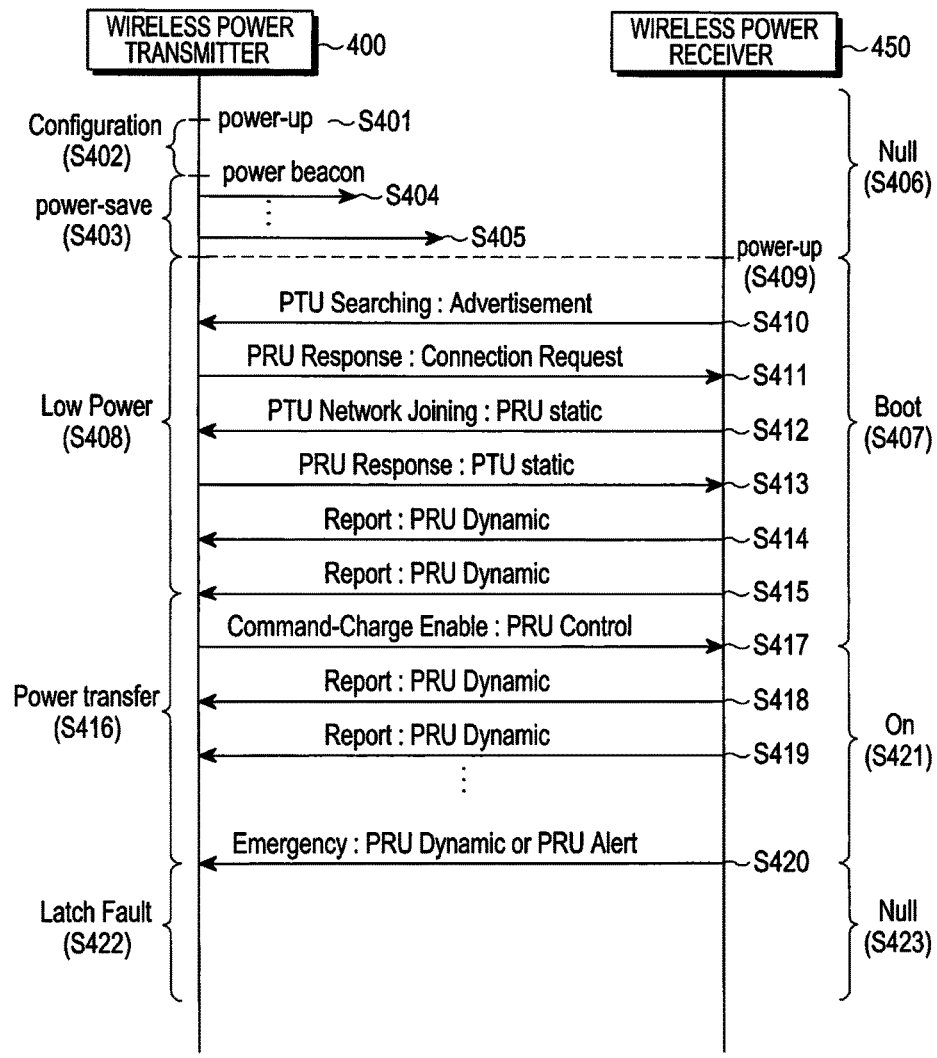
FIG. 4 is a flowchart illustrating the operation of the wireless power transmitter and the wireless power receiver, according to an embodiment of the present invention.

FIG. 4 is a flowchart illustrating the operation of the wireless power transmitter and the wireless power receiver, according to an embodiment of the present invention. As shown in FIG. 4, the wireless power transmitter 400 may be applied with power (S401). When the power is applied, the wireless power transmitter 400 may configure the environment (S402).

The wireless power transmitter 400 may enter a power saving mode (S403). In the power saving mode, the wireless power transmitter 400 may apply heterogeneous power beacons for detection in each cycle, which will be described in more detail in FIG. 6. For example, as shown in FIG. 4, the wireless power transmitter 400 may apply power beacons 404 and 405 for detection, and power values of the power beacons 404 and 405 for detection may be different from each other. Some, or all, of the power beacons 404 and 405 for detection may have the amount of power to drive the communication unit of the wireless power receiver 450. For example, the wireless power receiver 450 may drive the communication unit by some, or all, of the power beacons 404 and 405 for detection in order to thereby communicate with the wireless power transmitter 400. At this time, such a state may be referred to as a null state.

The wireless power transmitter 400 may detect a load change by the placement of the wireless power receiver 450. The wireless power transmitter 400 may enter a low power mode (S408). The low power mode will be described in more detail with reference to FIG. 6 as well. Meanwhile, the wireless power receiver 450 may drive the communication unit based on the power received from the wireless power transmitter 400 (S409).

The wireless power receiver 450 may transmit a wireless power transmitter searching signal (PTU searching) to the wireless power transmitter 400 (S410). The wireless power receiver 450 may transmit the wireless power transmitter searching signal by using an advertisement signal based on BLE. The wireless power receiver 450 may periodically transmit the wireless power transmitter searching signal, and may transmit the same until a response signal is received from the wireless power transmitter 400 or until a predetermined period of time expires.

When the wireless power transmitter searching signal is received from the wireless power receiver 450, the wireless power transmitter 400 may transmit a response signal (PRU Response) (S411). Here, the response signal may form a connection between the wireless power transmitter 400 and the wireless power receiver 450.

The wireless power receiver 450 may transmit a PRU static signal (S412). Here, the PRU static signal may be a signal indicating the state of the wireless power receiver 450.

Meanwhile, the PRU static signal may have a data structure as shown in Table 1.

TABLE 1

| Field | Octets | Description | Use | Units |
| --- | --- | --- | --- | --- |
| Optional fields validity | 1 | Defines which optional fields are populated | Mandatory | |
| PRU ID | 2 | ID of PRU | Mandatory | |
| PRU Category | 1 | Category of PRU | Mandatory | |
| PRU Information/ Capabilities | 1 | Capabilities of PRU (bit field) | Mandatory | |
| Hardware rev | 1 | Revision of the PRU HW | Mandatory | |
| Firmware rev | 1 | Revision of the PRU SW | Mandatory | |
| maximum power desired | 1 | Maximum power desired by PRU | Mandatory | mW*100 |
| VRECT_MIN_STATIC | 2 | VRECT_MIN(static, first estimate) | Mandatory | mV |
| VRECT_HIGH_STATIC | 2 | VRECT_HIGH(static, first estimate) | Mandatory | mV |
| VRECT_SET | 2 | VRECT_SET | Mandatory | mV |
| ΔR1 value | 2 | Delta R1 caused by PRU | Optional | .01 ohms(assume tabletop PTU) |
| RRX_IN value | 2 | RRX_IN value | Mandatory | Mohms |
| Rectifier imped xform | 1 | Rectifier impedance transformation | Mandatory | 0~5(0~250).02 x resolution |
| Rectifier efficiency | 1 | Efficiency of rectifier | Mandatory | 0-100%(0-255) |

Therefore, the wireless power transmitter 400 may transmit a PTU static signal, which contains data fields as shown in Table 1, to the wireless power receiver (S413). The PTU static signal transmitted by the wireless power transmitter 400 may be a signal that indicates the capability of the wireless power transmitter 400.

When the wireless power transmitter 400 and the wireless power receiver 450 transmit and receive the PRU static signal and the PTU static signal, the wireless power receiver 450 may periodically transmit a PRU dynamic signal (S414 and S415). The PRU dynamic signal may contain information on one or more parameters that are measured in the wireless power receiver 450. For example, the PRU dynamic signal may contain voltage information of the rear end of the rectifying unit of the wireless power receiver 450. The state of the wireless power receiver 450 may be named as a boot state (S407).

At this time, according to various embodiments of the present invention, a voltage value, which is readjusted depending on the situation, may be contained in the PRU static signal to then be transmitted so that the initially configured voltage value can be readjusted to conform to the situation by the PRU static signal.

Meanwhile, the wireless power transmitter 400 may enter a power transmission mode (S416), and the wireless power transmitter 400 may transmit a PRU control signal, which is a command signal, to allow the wireless power receiver 450 to perform the charging (S417). In the power transmission mode, the wireless power transmitter 400 may transmit charging power.

The PRU control signal transmitted by the wireless power transmitter 400 may contain information for enabling/disabling the charging of the wireless power receiver 450 and permission information. The PRU control signal may be transmitted when the wireless power transmitter 400 is to change the state of the wireless power receiver 450, or in a predetermined cycle (for example, in a cycle of 250 ms). The wireless power receiver 450 may change the configuration according to the PRU control signal, and may transmit a PRU dynamic signal for reporting the state of the wireless power receiver 450 (S418 and S419). The PRU dynamic signal transmitted by the wireless power receiver 450 may contain at least one piece of voltage information, current information, or state and temperature information of the wireless power receiver. At this time, the state of the wireless power receiver 450 may be referred to as an on state.

Meanwhile, the PRU dynamic signal may have a data structure as shown in Table 2.

TABLE 2

| Field | Octets | Description | Use | Units |
|---|---|---|---|---|
| Optional fields | 1 | Defines which optional fields are populated | Mandatory | |
| VRECT | 2 | Voltage at diode output | Mandatory | mV |
| IRECT | 2 | Current at diode output | Mandatory | mA |
| VOUT | 2 | Voltage at charge/battery port | Optional | mV |
| IOUT | 2 | Current at charge/battery port | Optional | mA |
| Temperature | 1 | Temperature of PRU | Optional | Deg C. from −40 C. |
| VRECT_MIN_DYN | 2 | VRECT_MIN_LIMIT(dynamic value) | Optional | mV |
| VRECT_SET_DYN | 2 | Desired VRECT(dynamic value) | Optional | mV |
| VRECT_HIGH_DYN | 2 | VRECT_HIGH_LIMIT(dynamic value) | Optional | mV |
| PRU alert | 1 | Warnings | Mandatory | Bit field |

The PRU dynamic signal, as shown in Table 2, may contain at least one of: optional field information; voltage information of the rear end of the rectifying unit of the wireless power receiver; current information of the rear end of the rectifying unit of the wireless power receiver; voltage information of the rear end of the DC/DC converter of the wireless power receiver; current information of the rear end of the DC/DC converter of the wireless power receiver; temperature information; minimum voltage value information (VRECT_MIN_DYN) of the rear end of the rectifying unit of the wireless power receiver; optimal voltage value information (VRECT_SET_DYN) of the rear end of the rectifying unit of the wireless power receiver; maximum voltage value information (VRECT_HIGH_DYN) of the rear end of the rectifying unit of the wireless power receiver; or alert information (PRU alert).

Thus, as described above, one or more configured voltage values {e.g., the minimum voltage value information (VRECT_MIN_DYN) of the rear end of the rectifying unit of the wireless power receiver, the optimal voltage value information (VRECT_SET_DYN) of the rear end of the rectifying unit of the wireless power receiver, or the maximum voltage value information (VRECT_HIGH_DYN) of the rear end of the rectifying unit of the wireless power receiver}, which are determined according to the situation, may be contained in the corresponding field of the PRU dynamic signal to then be transmitted. As described above, the PTU, which has received the PRU dynamic signal, adjusts the wireless charging voltage to be transmitted to each PRU with reference to the configured voltage values contained in the PRU dynamic signal.

The alert information may be formed in a data structure as shown in Table 3 below.

TABLE 3

| 7 | 6 | 5 | 4 | 3 | 2 | 1 | 0 |
|---|---|---|---|---|---|---|---|
| over voltage | over current | over temperature | charge complete | TA detect | transition | restart request | RFU |

The alert information, as shown in Table 3, may contain fields of over voltage, over current, over temperature, charge complete, wired charging terminal insertion detection (TA detect), SA mode/NSA mode transition, and restart request.

The wireless power receiver 450 may receive a PRU control signal in order to thereby perform the charging. For example, if the wireless power transmitter 400 has enough power to charge the wireless power receiver 450, the wireless power transmitter 400 may transmit a PRU control signal to enable the charging. Meanwhile, the PRU control signal may be transmitted whenever the charging state is changed. The PRU control signal, for example, may be transmitted every 250 ms, or may be transmitted when a parameter is changed. The PRU control signal may be configured to be transmitted within a predetermined threshold time (for example, 1 second) even without the change in the parameters.

Meanwhile, the wireless power receiver 450 may detect the occurrence of errors. The wireless power receiver 450 may transmit an alert signal to the wireless power transmitter 400 (S420). The alert signal may be transmitted by using the PRU dynamic signal or the PRU alert signal. For example, the wireless power receiver 450 may reflect the error conditions to the PRU alert field of Table 3, and may transmit the same to the wireless power transmitter 400. Alternatively, the wireless power receiver 450 may transmit a single alert signal (e.g., the PRU alert signal), which indicates the error conditions, to the wireless power transmitter 400. When the alert signal is received, the wireless power transmitter 400 may enter a latch fault mode (S422). The wireless power receiver 450 may enter the null state (S423).

Figure 5:
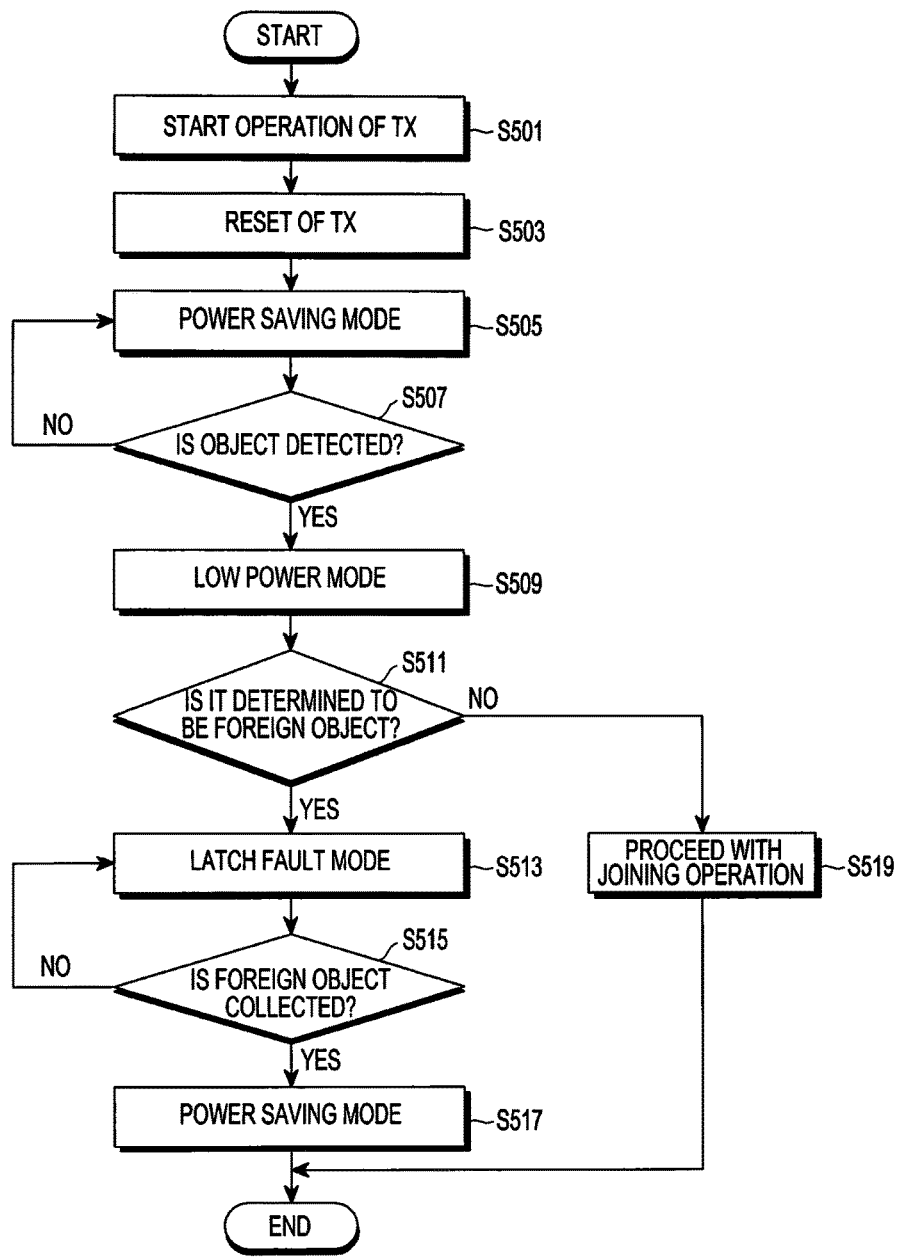
FIG. 5 is a flowchart illustrating the operation of the wireless power transmitter and the wireless power receiver, according to another embodiment of the present invention.
Figure 6:
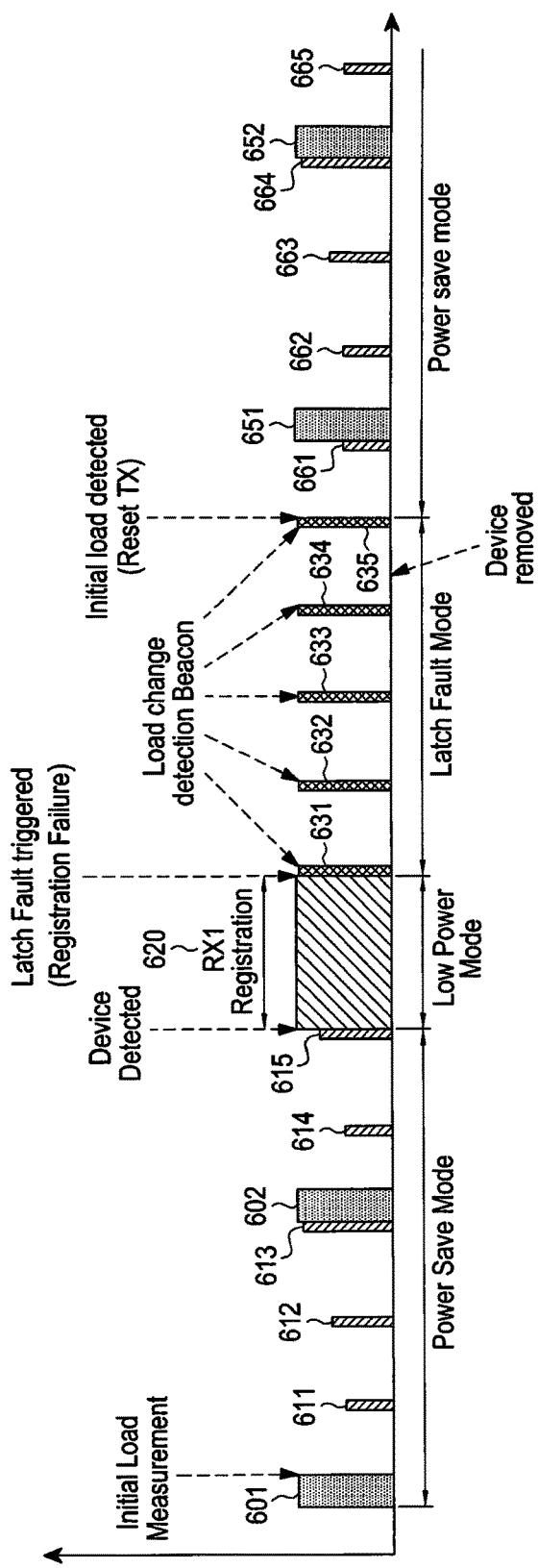
FIG. 6 is a graph showing the amount of power applied by the wireless power transmitter depending on a time axis.

FIG. 5 is a flowchart illustrating the operation of the wireless power transmitter and the wireless power receiver, according to another embodiment of the present invention. The control method of FIG. 5 will be described in more detail with reference to FIG. 6. FIG. 6 is a graph showing the amount of power applied by the wireless power transmitter depending on a time axis in the embodiment of FIG. 5.

As shown in FIG. 5, the wireless power transmitter may initiate the operation (S501). In addition, the wireless power transmitter may reset the initial configuration (S503). The wireless power transmitter may enter a power saving mode (S505). Here, the power saving mode may be a period in which the wireless power transmitter applies heterogeneous power with a different amount of power to the power transmitting unit. For example, it may be a period in which the wireless power transmitter applies, to the power transmitting unit, the second detection power 601 or 602 and the third detection power 611, 612, 613, 614, or 615 in FIG. 6. Here, the wireless power transmitter may periodically apply the second detection power 601 or 602 in the second cycle for the second period of time. The wireless power transmitter may periodically apply the third detection power 611, 612, 613, 614, or 615 in the third cycle for the third period of time. Meanwhile, although the third detection power values 611, 612, 613, 614, and 615 are illustrated to be different from each other, the third detection power values 611, 612, 613, 614, and 615 may be different, or may be the same.

For example, after outputting the third detection power 611, the wireless power transmitter may output the third detection power 612 of the same amount of power. As described above, in the case where the wireless power transmitter outputs the third detection power of the same value, the third detection power may have the amount of power that is capable of detecting the smallest wireless power receiver (for example, the wireless power receiver of category 1).

On the contrary, after outputting the third detection power 611, the wireless power transmitter may output the third detection power 612, which is a different amount of power. As described above, in the case where the wireless power transmitter outputs the third detection power of a different value, the third detection power may have an amount of power that is capable of detecting the wireless power receivers of categories 1 to 5. For example, the third detection power 611 may have an amount of power that is capable of detecting the wireless power receiver of category 5, and the third detection power 612 may have an amount of power that is capable of detecting the wireless power receiver of category 3. In addition, the third detection power 613 may have an amount of power that is capable of detecting the wireless power receiver of category 1.

Meanwhile, the second detection power 601 or 602 may drive the wireless power receiver. More specifically, the second detection power 601 or 602 may have an amount of power that is capable of driving the controller and the communication unit of the wireless power receiver.

The wireless power transmitter may apply, to the power receiving unit, the second detection power 601 or 602 and the third detection power 611, 612, 613, 614, or 615 in the second cycle and in the third cycle, respectively. In the case where the wireless power receiver is placed on the wireless power transmitter, the impedance viewed from one point of the wireless power transmitter may be changed. The wireless power transmitter may detect a change in the impedance while applying the second detection power 601 or 602 and the third detection power 611, 612, 613, 614, or 615. For example, the wireless power transmitter may detect a change in the impedance while applying the third detection power 615. According to this, the wireless power transmitter may detect an object (S507). If no object is detected (S507—N), the wireless power transmitter may maintain the power saving mode in which heterogeneous power is periodically applied (S505).

Meanwhile, if the object is detected due to the change in the impedance (S507—Y), the wireless power transmitter may enter a low power mode. Here, the low power mode means a mode in which the wireless power transmitter applies driving power that is capable of driving the controller and the communication unit of the wireless power receiver. For example, in FIG. 6, the wireless power transmitter may apply the drive power 620 to the power transmitting unit. The wireless power receiver may receive the drive power 620 in order to thereby drive the controller and the communication unit. The wireless power receiver may perform communication with the wireless power transmitter in a predetermined manner based on the drive power 620. For example, the wireless power receiver may transmit and receive data that is required for the verification, and, based on the same, may join the wireless power network managed by the wireless power transmitter. However, when a foreign object other than the wireless power receiver is placed, the data transmission and reception cannot be performed. Accordingly, the wireless power transmitter may determine whether or not the placed object is a foreign object (S511). For example, if the wireless power transmitter has failed to receive a response from the object for a predetermined period of time, the wireless power transmitter may determine the object to be a foreign object.

If the object is determined to be a foreign object (S511—Y), the wireless power transmitter may enter the latch fault mode (S513). On the contrary, if the object is determined to not be a foreign object (S511—N), the wireless power transmitter may proceed with a registration operation (S519). For example, the wireless power transmitter may periodically apply the first power 631 to 634 of FIG. 6 in the first cycle. The wireless power transmitter may detect a change in the impedance while applying the first power. For example, if the foreign object is collected (S515—Y), the wireless power transmitter may detect the impedance change in order to thereby determine that the foreign object has been collected. Alternatively, if the foreign object is not collected (S515—N), the wireless power transmitter may not detect the impedance change in order to thereby determine that the foreign object has not been collected. If the foreign object is not collected, the wireless power transmitter may output at least one of a lamp or an alert sound in order to thereby inform the user that the wireless power transmitter is currently in the error state. According to this, the wireless power transmitter may include an output unit that outputs at least one of a lamp and an alert sound.

If it is determined that a foreign object has not been collected (S515—N), the wireless power transmitter may maintain the latch fault mode (S513). Meanwhile, if it is determined that a foreign object has been collected (S515—Y), the wireless power transmitter may re-enter the power saving mode (S517). For example, the wireless power transmitter may apply the second power 651 or 652 and the third power 661 to 665 of FIG. 5.

As described above, the wireless power transmitter may enter the latch fault mode if a foreign object other than the wireless power receiver is placed. Furthermore, the wireless power transmitter may determine whether or not a foreign object is collected on the basis of a change in the impedance due to the power applied in the latch fault mode. That is, the criterion for entering the latch fault mode may be the placement of a foreign object in the embodiment of FIGS. 5 and 6. Meanwhile, in addition to the placement of a foreign object, the wireless power transmitter may have various criteria for entering the latch fault mode. For example, the wireless power transmitter may be cross-connected with the placed wireless power receiver, and in this case, the wireless power transmitter may enter the latch fault mode.

According to this, in the case of the occurrence of the cross-connection, the wireless power transmitter is required to return to the initial state, and the wireless power receiver is required to be collected. The wireless power transmitter may configure, as a criterion for entering the latch fault mode, the cross-connection in which the wireless power receiver that is placed on another wireless power transmitter joins the wireless power network. The operation of the wireless power transmitter in the case of the occurrence of errors, including the cross-connection, will be described with reference to FIG. 7.

Figure 7:
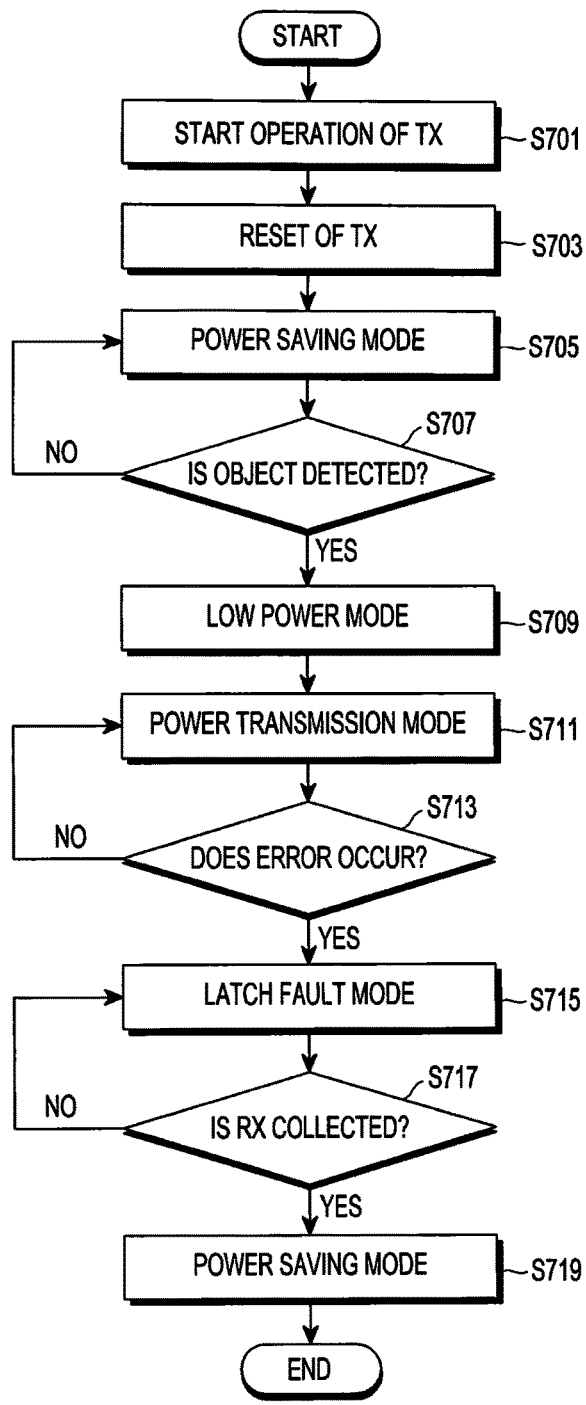
FIG. 7 is a flowchart illustrating a control method of the wireless power transmitter, according to an embodiment of the present invention.
Figure 8:
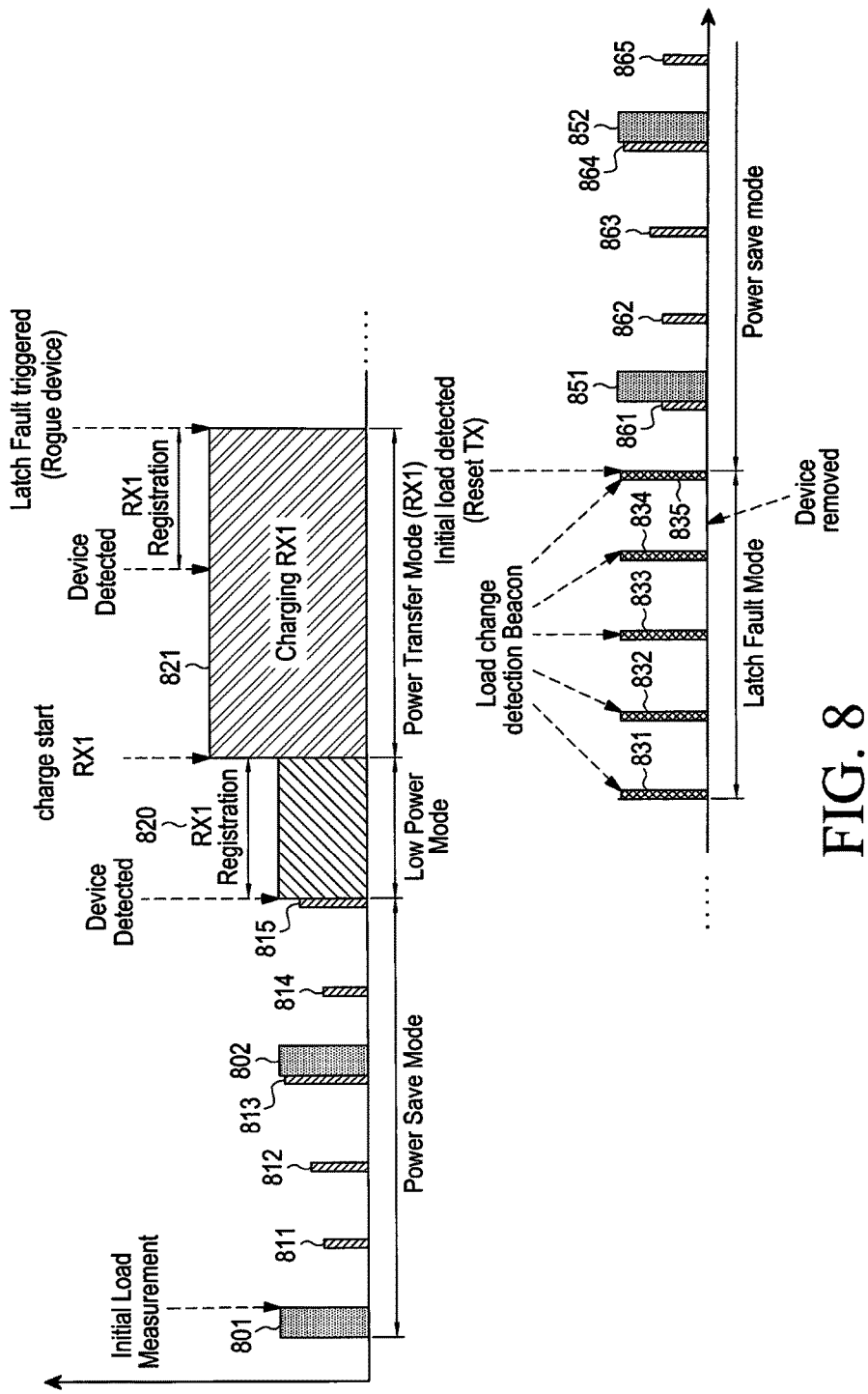
FIG. 8 is a graph showing the amount of power applied by the wireless power transmitter depending on a time axis, according to the embodiment of FIG. 7.

FIG. 7 is a flowchart illustrating a control method of the wireless power transmitter, according to an embodiment of the present invention. The control method of FIG. 7 will be described in more detail with reference to FIG. 8. FIG. 8 is a graph showing the amount of power applied by the wireless power transmitter depending on a time axis, according to the embodiment of FIG. 7.

The wireless power transmitter may initiate the operation (S701). In addition, the wireless power transmitter may reset the initial configuration (S703). The wireless power transmitter may enter a power saving mode (S705). Here, the power saving mode may be a period in which the wireless power transmitter applies heterogeneous power with a different amount of power to the power transmitting unit. For example, it may be a period in which the wireless power transmitter applies, to the power transmitting unit, the second detection power 801 or 802, and the third detection power 811, 812, 813, 814, or 815 in FIG. 8. Here, the wireless power transmitter may periodically apply the second detection power 801 or 802 in the second cycle for the second period of time. The wireless power transmitter may periodically apply the third detection power 811, 812, 813, 814, or 815 in the third cycle for the third period of time. Meanwhile, although the third detection power values 811, 812, 813, 814, and 815 are illustrated to be different from each other, the third detection power values 811, 812, 813, 814, and 815 may be different, or may be the same.

Meanwhile, the second detection power 801 or 802 may drive the wireless power receiver. More specifically, the second detection power 801 or 802 may have an amount of power that is capable of driving the controller and the communication unit of the wireless power receiver.

The wireless power transmitter may apply, to the power receiving unit, the second detection power 801 or 802 and the third detection power 811, 812, 813, 814, or 815 in the second cycle and in the third cycle, respectively. In the case where the wireless power receiver is placed on the wireless power transmitter, the impedance viewed from one point of the wireless power transmitter may be changed. The wireless power transmitter may detect a change in the impedance while applying the second detection power 801 or 802 and the third detection power 811, 812, 813, 814, or 815. For example, the wireless power transmitter may detect a change in the impedance while applying the third detection power 815. According to this, the wireless power transmitter may detect an object (S707). If no object is detected (S707—N), the wireless power transmitter may maintain the power saving mode in which heterogeneous power is periodically applied (S705).

Meanwhile, if the object is detected due to the change in the impedance (S707—Y), the wireless power transmitter may enter a low power mode (S709). Here, the low power mode means a mode in which the wireless power transmitter applies driving power that is capable of driving the controller and the communication unit of the wireless power receiver. For example, in FIG. 8, the wireless power transmitter may apply the drive power 820 to the power transmitting unit. The wireless power receiver may receive the drive power 820 in order to thereby drive the controller and the communication unit. The wireless power receiver may perform communication with the wireless power transmitter in a predetermined manner based on the drive power 820. For example, the wireless power receiver may transmit and receive data that is required for the verification, and, based on the same, may join the wireless power network managed by the wireless power transmitter.

Thereafter, the wireless power transmitter may enter a power transmission mode for transmitting charging power (S711). For example, the wireless power transmitter may apply the charging power 821, as shown in FIG. 8, and the charging power may be transmitted to the wireless power receiver.

The wireless power transmitter may determine whether or not an error occurs in the power transmission mode. Here, the error may be the placement of a foreign object on the wireless power transmitter, a cross-connection, over voltage, over current, over temperature, or the like. The wireless power transmitter may include a sensing unit that can measure over voltage, over current, over temperature, or the like. For example, the wireless power transmitter may measure the voltage or current of a reference point, and if the measured voltage or current exceeds a threshold value, the wireless power transmitter may determine that the criterion for over voltage or over current has been satisfied. Alternatively, the wireless power transmitter may include temperature sensing means that measure the temperature of the reference point of the wireless power transmitter. If the temperature of the reference point exceeds a threshold value, the wireless power transmitter may determine that the criterion for over temperature has been satisfied.

Meanwhile, if the state is determined to be over voltage, over current, or over temperature according to the measurement of the temperature, voltage, or current, the wireless power transmitter may reduce the wireless charging power to a predetermined value in order to thereby prevent the over voltage, over current, or over temperature. At this time, if the reduced voltage value of the wireless charging power is less than a configured minimum value {e.g., the minimum voltage value ($V_{RECT\_MIN\_DYN}$) of the rear end of the rectifying unit of the wireless power receiver}, the wireless charging is stopped, so the configured voltage value may be readjusted according to the embodiment of the present invention.

Although the embodiment of FIG. 8 illustrates the error in which a foreign object is further placed on the wireless power transmitter, the error is not limited thereto, and it may be easily understood by those skilled in the art that the wireless power transmitter may also operate in a similar manner in the case of a cross-connection, over voltage, over current, or over temperature.

If no error has occurred (S713—N), the wireless power transmitter may maintain the power transmission mode (S711). Meanwhile, if an error has occurred (S713—Y), the wireless power transmitter may enter the latch fault mode (S715). For example, the wireless power transmitter may apply the first power 831 to 835 as shown in FIG. 8. Furthermore, the wireless power transmitter may output an error occurrence display that includes at least one of a lamp or an alert sound in the latch fault mode. If it is determined that the foreign object or the wireless power receiver has not been collected (S717—N), the wireless power transmitter may maintain the latch fault mode (S715). Meanwhile, if it is determined that the foreign object or the wireless power receiver has been collected (S717—Y), the wireless power transmitter may enter the power saving mode again (S719). For example, the wireless power transmitter may apply the second power 851 or 852 and the third power 861 to 865 of FIG. 8.

The operation has been described above, in which an error occurs while the wireless power transmitter transmits the charging power. Hereinafter, the operation will be described in which a plurality of wireless power receivers on the wireless power transmitter receive the charging power.

Figure 9:
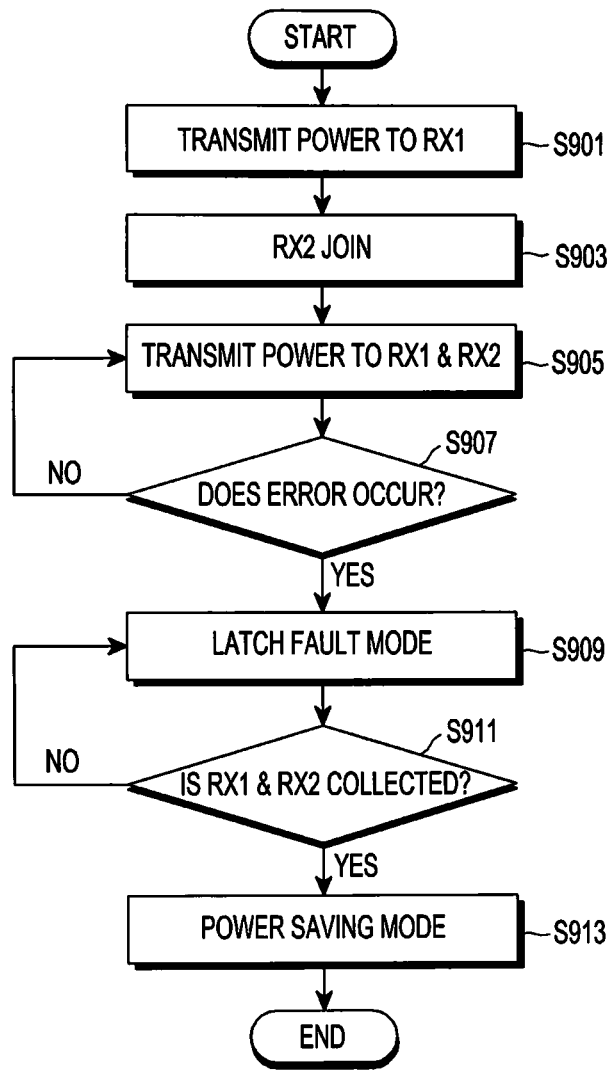
FIG. 9 is a flowchart illustrating a control method of the wireless power transmitter, according to an embodiment of the present invention.
Figure 10:
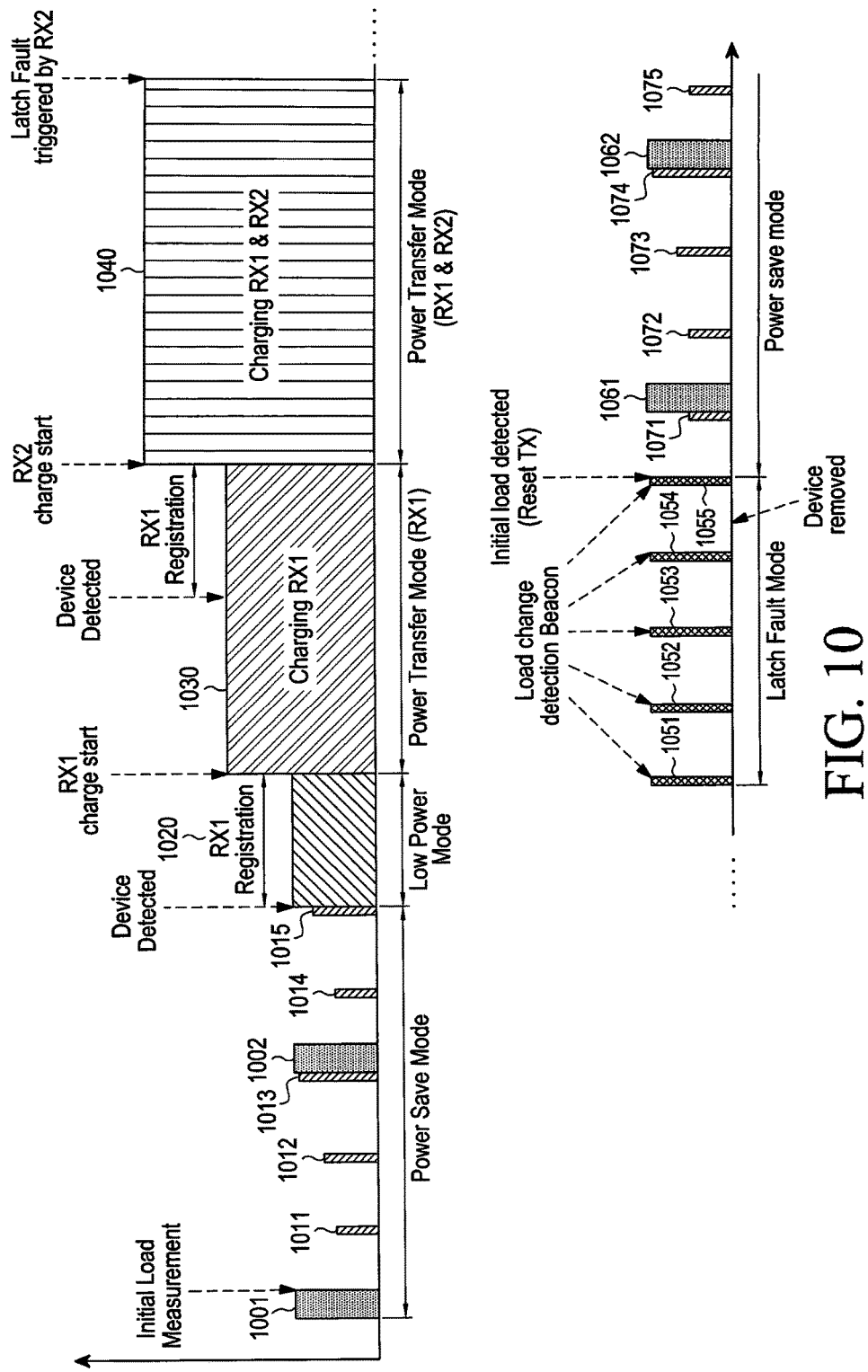
FIG. 10 is a graph showing the amount of power applied by the wireless power transmitter depending on a time axis, according to the embodiment of FIG. 9.

FIG. 9 is a flowchart illustrating a control method of the wireless power transmitter, according to an embodiment of the present invention. The control method of FIG. 9 will be described in more detail with reference to FIG. 10. FIG. 10 is a graph showing the amount of power applied by the wireless power transmitter depending on a time axis, according to the embodiment of FIG. 9.

As shown in FIG. 9, the wireless power transmitter may transmit charging power to the first wireless power receiver (S901). Furthermore, the wireless power transmitter may further allow the second wireless power receiver to join the wireless power network (S903). In addition, the wireless power transmitter may transmit charging power to the second wireless power receiver (S905). More specifically, the wireless power transmitter may apply a sum of charging power values required by the first wireless power receiver and the second wireless power receiver to the power receiving unit.

FIG. 10 illustrates an embodiment for operation S901 to operation S905. For example, the wireless power transmitter may maintain the power saving mode for applying the second detection power 1001 or 1002 and the third detection power 1011 to 1015. Thereafter, the wireless power transmitter may detect the first wireless power receiver, and may enter a low power mode for maintaining the detection power 1020. Thereafter, the wireless power transmitter may enter a power transmission mode for applying the first charging power 1030. The wireless power transmitter may detect the second wireless power receiver, and may let the second wireless power receiver join the wireless power network. Furthermore, the wireless power transmitter may apply the second charging power 1040, which has an amount of power corresponding to a sum of power values required by the first wireless power receiver and the second wireless power receiver.

Referring back to FIG. 9, the wireless power transmitter may transmit the charging power to both the first wireless power receiver and the second wireless power receiver (S905), and may detect the occurrence of an error during the transmission (S907). Here, the error may be the placement of a foreign object, a cross-connection, over voltage, over current, or over temperature, as described above. If no error has occurred (S907—N), the wireless power transmitter may maintain the application of the second charging power 1040.

Meanwhile, if an error has occurred (S907—Y), the wireless power transmitter may enter the latch fault mode (S909). For example, the wireless power transmitter may apply the first power 1051 to 1055 of FIG. 10 in the first cycle. The wireless power transmitter may determine whether or not all of the wireless power receiver and the second wireless power receiver are collected (S911). For example, the wireless power transmitter may detect a change in the impedance while applying the first power 1051 to 1055. The wireless power transmitter may determine whether or not all of the wireless power receiver and the second wireless power receiver are collected based on whether or not the impedance returns to an initial value.

If it is determined that all of the wireless power receiver and the second wireless power receiver have been collected (S911—Y), the wireless power transmitter may enter the power saving mode (S913). For example, the wireless power transmitter may apply the second detection power 1061 or 1062, and the third detection power 1071 to 1075 in the second cycle and in the third cycle, respectively, as shown in FIG. 10.

As described above, in the case of applying the charging power to a plurality of wireless power receivers, the wireless power transmitter can easily determine whether or not the wireless power receiver or the foreign object is collected upon the occurrence of errors.

Figure 11:
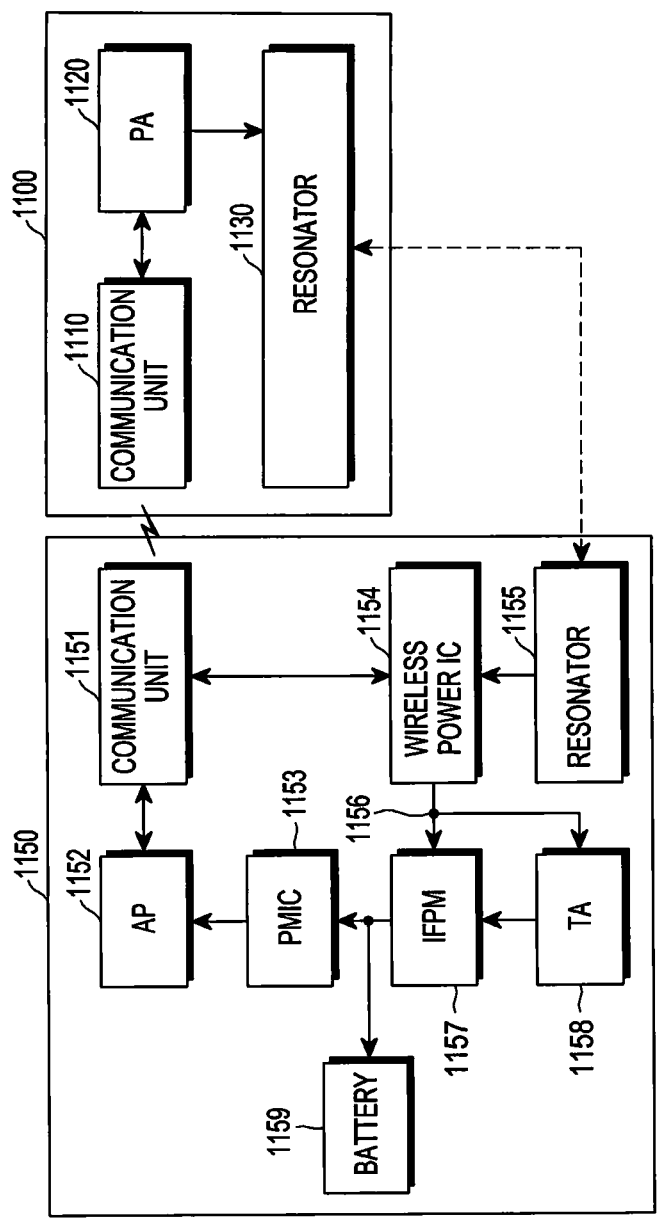
FIG. 11 is a block diagram of the wireless power transmitter and the wireless power receiver, according to an embodiment of the present invention.

FIG. 11 is a block diagram of the wireless power transmitter and the wireless power receiver, according to an embodiment of the present invention.

The wireless power transmitter 1100 may include a communication unit 1110, a power amplifier (PA) 1120, and a resonator 1130. The wireless power receiver 1150 may include a communication unit 1151, an applications processor (AP) 1152, a power management integrated circuit (PMIC) 1153, a wireless power integrated circuit (WPIC) 1154, a resonator 1155, an interface power management (IFPM) IC 1157, a travel adapter (TA) 1158, and a battery 1159.

The communication unit 1110 may perform communication with the communication unit 1151 based on a predetermined scheme (for example, the BLE scheme). For example, the communication unit 1151 of the wireless power receiver 1150 may transmit, to the communication unit 1110 of the wireless power transmitter 1100, a PRU dynamic signal that has a data structure shown in Table 2. As described above, the PRU dynamic signal may contain at least one piece of voltage information, current information, temperature information, or alert information, of the wireless power receiver 1150.

Based on the received PRU dynamic signal, an output power value from the power amplifier 1120 may be adjusted. For example, if the wireless power receiver 1150 comes to a state of over voltage, over current, or over temperature, the power value outputted from the power amplifier 1120 may be reduced. Furthermore, if the voltage or current value of the wireless power receiver 1150 is less than a predetermined value, the power value outputted from the power amplifier 1120 may increase.

The charging power from the resonator 1130 may be wirelessly transmitted to the resonator 1155.

The wireless power integrated circuit 1154 may rectify the charging power received from resonator 1155, and may perform DC/DC converting. The wireless Power integrated circuit 1154 may drive the communication unit 1151, or may charge the battery 1159 by using the converted power.

Meanwhile, a wired charging terminal may be inserted into the travel adapter 1158. A wired charging terminal, such as 30-pin connector or a USB connector, may be inserted into the travel adapter 1158, and the travel adapter 1158 may receive power supplied from the external power source in order to thereby charge the battery 1159.

The interface power management integrated circuit 1157 may process the power supplied from the wired charging terminal in order to thereby output the same to the battery 1159 and the power management integrated circuit 1153.

The power manager integrated circuit 1153 may manage the wirelessly received power, the wiredly received power, or the power applied to each element of the wireless power receiver 1150. The AP 1152 may receive power information from the power manager integrated circuit 1153, and may control the communication unit 1151 to transmit the PRU dynamic signal for reporting the same.

Meanwhile, a node 1156, which is connected to the wireless power integrated circuit 1154, may be connected to the travel adapter 1158. In the case where a wired charging connector is inserted into the travel adapter 1158, a predetermined voltage (for example, 5V) may be applied to the node 1156. The wireless power integrated circuit 1154 may monitor the voltage applied to the node 1156 in order to thereby determine whether or not the travel adapter is inserted.

As described above, the concept of the wireless charging system that may be applied to the embodiment of the present invention has been described with reference to FIGS. 1 to 11. Hereinafter, a power distribution method for wireless charging, according to the embodiment of the present invention, will be described with reference to FIGS. 12 to 14.

Figure 12:
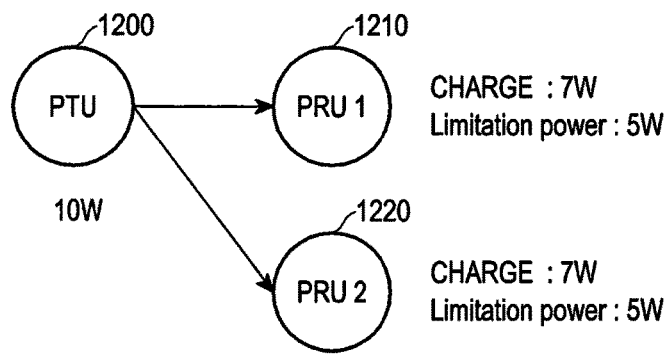
FIG. 12 is a view showing a power distribution method for a plurality of wireless power receivers, according to the first embodiment of the present invention.

FIG. 12 is a view showing a power distribution method for a plurality of wireless power receivers, according to the first embodiment of the present invention.

FIG. 12 shows that the available charging power of the PTU 1200 is 10 W and the maximum demand power of the PRU1 1210 is 7 W on the assumption that the efficiency of the resonator is 100%. When the PTU 1200 receives a message that contains the maximum demand power information and the limitation power information for the PRU1 1210, the PTU 1200 may transmit the maximum demand power to the PRU1 1210 because the PTU 1200 may provide the maximum demand power. In addition, the PTU 1200 may deliver power transmission information to the PRU1 1210.

Subsequently, when the PRU2 1220 additionally joins, a connection may be made by BLE ADV, and the PTU 1200 may receive, from the PRU2 1220, the maximum demand power information and the limitation power information of the PRU2 1220. The PTU 1200 may calculate the amount of power in order to thereby determine power redistribution.

In this case, since the limitation power of each of the PRU1 1210 and PRU2 1220 is 5 W, even though the maximum demand power thereof is 7 W, the PTU 1200 may distribute a power of 5 W to each of the PRU1 1210 and PRU2 1220. Here, the maximum demand power represents the maximum power that can be received by the PRU, and the limitation power represents the minimum power that may be received by the PRU. For example, if the limitation power of the PRU1 1210 is 5 W, it means that the PRU1 1210 can receive all the power of 5 W to 7 W. Alternatively, the limitation power may be configured step by step. For example, if the limitation power of the PRU1 1210 is configured to be 10 W=>5 W=>3 W, it means that the PRU1 1210 may receive only the power corresponding to 10 W, 5 W, and 3 W, respectively, from the PTU 1200.

According to this, when the PRU2 1220 newly joins, since the PTU 1200 cannot transmit the maximum demand power of the PRU2 1220, the PTU 1200 reduces the power for the PRU1 1210 from 10 W to 5 W. Accordingly, the PTU 1200 may instruct the PRU2 1220 to perform the charging at 5 W. Alternatively, the PTU 1200 may inform the PRU2 1220 of the available power based on the phased limitation power information of the PRU2 1220. According to this, the PRU2 1220 may adjust the limitation power.

The PTU 1200 may receive such a limitation power through a message that is received from each of the PRU1 1210 and the PRU2 1220 after connecting to the PRU1 1210 and the PRU2 1220, respectively. The message may be sent in the preparation stage before transmitting power, and may contain the requirements of the PRU. The requirements, for example, may contain fixed values, such as maximum demand power information, a phased limitation power, or a fixed limitation power. The message may be transmitted through a communication channel between the PTU and the PRU.

In addition, the messages may also be transmitted to the PTU 1200 if various situations that require the adjustment of the power occur in the PRU1 1210 and the PRU2 1220. The PTU 1200 may receive the message, and may readjust the power to be a new value according to the situation (for example, when the number of PRUs is changed, when a certain PRU is fully charged, when the charging mode of the PRU is changed, or when the charging is released). For example, if the temperature increases excessively, the current flows too much, or the voltage is excessively high during the charging, the PRU may transmit the readjusted value $V_{RECT}$ to the PTU in order to thereby control the charging power.

In addition, in another embodiment, if the charging mode of the PRU switches from a CC (continuous current) mode to a CV (continuous voltage) mode, or if the charging is complete in the CV mode, the transmission of more power is not required, so the PTU may dynamically adjust the power value for each PRU in order to thereby redistribute the charging power.

The PTU 1200 may transmit current charging power information to the PRU1 1210 and the PRU2 1220. For example, the PTU 1200 may provide the PRU1 1210 and the PRU2 1220 with information stating that the PTU 1200 transmits 5 W of power to each of the PRU1 1210 and the PRU2 1220.

Figure 13:
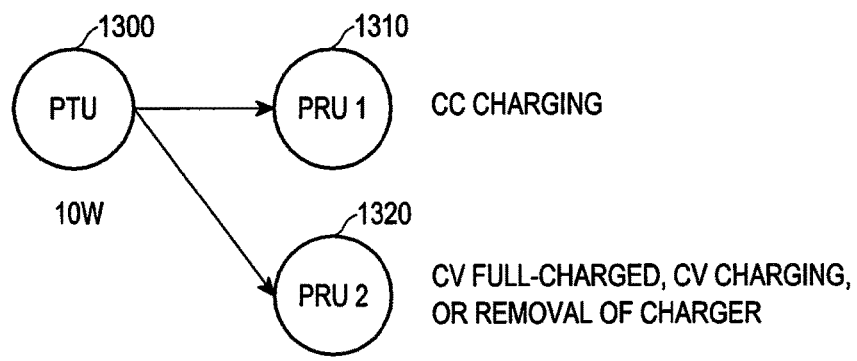
FIG. 13 is a view showing a power distribution method for a plurality of wireless power receivers, according to the second embodiment of the present invention.

FIG. 13 is a view showing a power distribution method for a plurality of wireless power receivers, according to the second embodiment of the present invention.

FIG. 13 shows an example in which the power adjustment is required due to the CV charging completion, the CV mode switch, or the removal of the charger in the PRU2 1320 while the available charging power of the PTU 1200 is 10 W and the PRU1 1310 is being charged in the CC mode. For example, if the charging mode of the PRU2 1320 switches from the CC mode to the CV mode, or if the charging is complete in the CV mode, the transmission of more power is not necessary. In addition, when the PRU2 1320 is out of the charging range of the PTU 1300, that is, if the PRU2 1320 is removed from the PTU 1300, the power transmission is not necessary. When the power transmission to the PRU2 1320 is not necessary according to such various cases, the PTU 1300 may recalculate the charging supply power capability to then be supplied. According to this, the PTU 1300 may convert the limitation power, which has been supplied to the PRU1 1310, to the maximum demand power to then be supplied. For example, provided that the maximum demand power of the PRU1 1310 is 7 W and the limitation power thereof is 5 W, the PTU 1300 may increase the power from 5 W, which has been supplied to charge the PRU1 1310, to 7 W in order to thereby perform the charging.

In this state, if the PRU additionally joins, the PTU 1300 may calculate the amount of power. If the PTU 1300 determines that the PTU 1300 cannot transmit the limitation power required by the PRU that is being charged by redistributing the power as a result of the calculation, the PTU 1300 may reject the newly joining PRU. That is, the additionally joining PRU may not be charged.

At this time, the method for converting the limitation power to the maximum demand power is as follows.

First, the PTU 1300 may transmit a load switch off command to the PRU1 1310. According to this, the PRU1 1310 turns off a load switch in order to thereby perform resetting. Then, the PTU 1300 may control the power with respect to the PRU1 1310 again in order to thereby perform the charging. Here, as the implementation issue of a PRU configuration algorithm, in order to reduce a sudden change in the voltage of the PRU1 1310, the PRU1 1310 may be turned off first, and then the PRU2 may be turned on.

Figure 14:
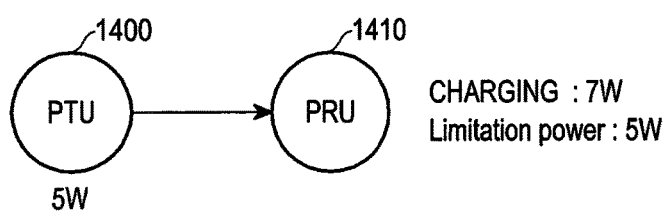
FIG. 14 is a view showing a power distribution method for a plurality of wireless power receivers, according to the third embodiment of the present invention.

FIG. 14 is a view showing a power distribution method for a plurality of wireless power receivers, according to the third embodiment of the present invention.

FIG. 14 shows an example in which: the available charging power of the PTU 1400 is 5 W; the maximum demand power of the PRU1 1410 is 7 W; and the limitation power thereof is 5 W. In this case, even though the available charging power 5 W of the PTU 1400 is less than the maximum demand power 7 W of the PRU1 1410, the charging can be performed because the available charging power of the PTU 1400 satisfies the limitation power 5 W of the PRU1 1410.

According to this, if it is determined that the PTU 1400 cannot provide the maximum demand power of the PRU1 1410, the PTU 1400 may check the limitation power of the PRU1 1410, and may inform of the available power of the PTU 1400. Then, the PRU1 1410 may adjust the demand power. In this method of the PRU, for example, the PTU may adjust the settings, or the PRU may set the demand power to then receive an input of the charging current.

As described above, when the PTU receives, from the PRU, the limitation power information and/or the reduced power information, the PTU determines the supply power to the PRU.

The invention claimed is:

1. A method for controlling a wireless power transmitter, the method comprising:
    transmitting, through a power transmitting circuit of the wireless power transmitter, power for charging a first wireless power receiver;
    receiving, through a communication unit of the wireless power transmitter, demand power information of a second wireless power receiver while transmitting the power for charging the first wireless power receiver, wherein the demand power information of the second wireless power receiver comprises a maximum power for the second wireless power receiver;
    identifying, by a controller of the wireless power transmitter, whether the wireless power transmitter is capable of providing the maximum power for the second wireless power receiver;
    transmitting, through the communication unit, a power adjustment command to the second wireless power receiver if the wireless power transmitter is not capable of providing the maximum power for the second wireless power receiver, wherein the power adjustment command requests to reduce an amount of power to be received by the second wireless power receiver to a range that the wireless power transmitter is capable of supporting; and
    transmitting, through the power transmitting circuit, power for charging the first wireless power receiver and the second wireless power receiver based on at least the reduced amount of power.

2. The method according to claim 1, wherein the demand power information further contains limitation power information.

3. The method according to claim 1, further comprising receiving, through the communication unit, demand power information that contains maximum power desired by the first wireless power receiver before transmitting the power for charging the first wireless power receiver.

4. The method according to claim 3, wherein the determining whether the wireless power transmitter is capable of providing the maximum power for by the second wireless power receiver comprises:
    determining a maximum power provided by the wireless power transmitter is less than a sum of the maximum power desired by the first wireless power receiver and the maximum power for the second wireless power receiver.

5. The method according to claim 1, further comprising transmitting, through the communication unit, a communication signal to initiate wirelessly receiving power to the second wireless power receiver after transmitting the power for charging the first wireless power receiver and the second wireless power receiver.

6. The method according to claim 1, further comprising receiving adjusted demand power information from the second wireless power receiver in response to informing the second wireless power receiver to decrease the power drawn by the second wireless power receiver.

7. The method according to claim 1, further comprising recalculating the power for the first wireless power receiver and the second wireless receiver and supplying the power when a charging mode of at least one of the first wireless power receiver and the second wireless power receiver is changed.

8. The method according to claim 1, further comprising informing, through the communication unit, the first wireless power receiver to decrease the power drawn by the first wireless power receiver, if the wireless power transmitter is not capable of providing the maximum power for the second wireless power receiver.

9. A wireless power transmitter comprising:
    a power transmitting circuit configured to transmit power for charging a first wireless power receiver;
    a communication unit; and
    a controller configured to:
        receive, through the communication unit, demand power information of a second wireless power receiver while transmitting the power for charging the first wireless power receiver, wherein the demand power information of the second wireless power receiver comprises a maximum power for the second wireless power receiver, identify whether the wireless power transmitter is capable of providing the maximum power for the second wireless power receiver, transmit, through the communication unit, a power adjustment command to the second wireless power receiver if the wireless power transmitter is not capable of providing the maximum power for the second wireless power receiver, wherein the power adjustment command requests to reduce an amount of power drawn by the second wireless power receiver to a range that the wireless power transmitter is capable of supporting, and transmit, through the power transmitting circuit, power for charging the first wireless power receiver and the second wireless power receiver, respectively, based at least the reduced amount of power.

10. The wireless power transmitter according to claim 9, wherein the demand power information further contains limitation power information.

11. The wireless power transmitter according to claim 9, wherein the controller receives, through the communication unit, demand power information that contains maximum power information desired by the first wireless power receiver before transmitting the power for charging the first wireless power receiver.

12. The wireless power transmitter according to claim 11, wherein the controller determines whether a maximum power provided by the wireless power transmitter is less than a sum of the maximum power desired by the first wireless power receiver and the maximum power for the second wireless power receiver.

13. The wireless power transmitter according to claim 9, wherein the controller transmits, through the communication unit, a communication signal to initiate wirelessly receiving power to the second wireless power receiver after transmitting the power for charging the first wireless power receiver and the second wireless power receiver.

14. The wireless power transmitter according to claim 9, wherein the controller recalculates the power for the first wireless power receiver and the second wireless receiver and supplies the power when the charging mode of at least one of the first wireless power receiver and the second wireless power receiver is changed.

15. The wireless power transmitter according to claim 9, wherein the controller informs, through the communication unit, the first wireless power receiver to decrease the power drawn by the first wireless power receiver if the wireless power transmitter is not capable of providing the maximum power for the second wireless power receiver.

* * * * *

UNITED STATES PATENT AND TRADEMARK OFFICE
CERTIFICATE OF CORRECTION

PATENT NO. : 10,454,308 B2
APPLICATION NO. : 15/037916
DATED : October 22, 2019
INVENTOR(S) : Hyuk-Choon Kwon et al.

Page 1 of 2

It is certified that error appears in the above-identified patent and that said Letters Patent is hereby corrected as shown below:

In the Claims

Column 19, Line 59, --first-- should be added after "transmitter,".

Column 19, Line 63, --first-- should be added after "the".

Column 20, Line 14, --second-- should be added after "circuit,".

Column 20, Line 24, --first-- should be added after "the".

Column 20, Line 38, --second-- should be added after "the".

Column 20, Line 47, --second-- should be added between "the" and "power".

Column 20, Line 48, --second-- should be added between "the" and "power".

Column 20, Line 54, --first-- should be added between "the" and power".

Column 20, Line 59, --first-- should be added between "transmit" and "power".

Column 20, Line 65, --first-- should be added after "the".

Column 21, Line 16, --second-- should be added after "circuit,".

Column 21, Line 27, --first-- should be added between "the" and "power".

Column 22, Line 11, --second-- should be added between "the" and "power".

Signed and Sealed this
Tenth Day of December, 2019

Andrei Iancu
*Director of the United States Patent and Trademark Office*

Column 22, Line 14, --second-- should be added between "the" and "power".

Column 22, Line 16, --second-- should be added between "the" and "power".